(No Model.) 6 Sheets—Sheet 1.
G. W. SHUMAN.
HARVESTER.
No. 377,647. Patented Feb. 7, 1888.
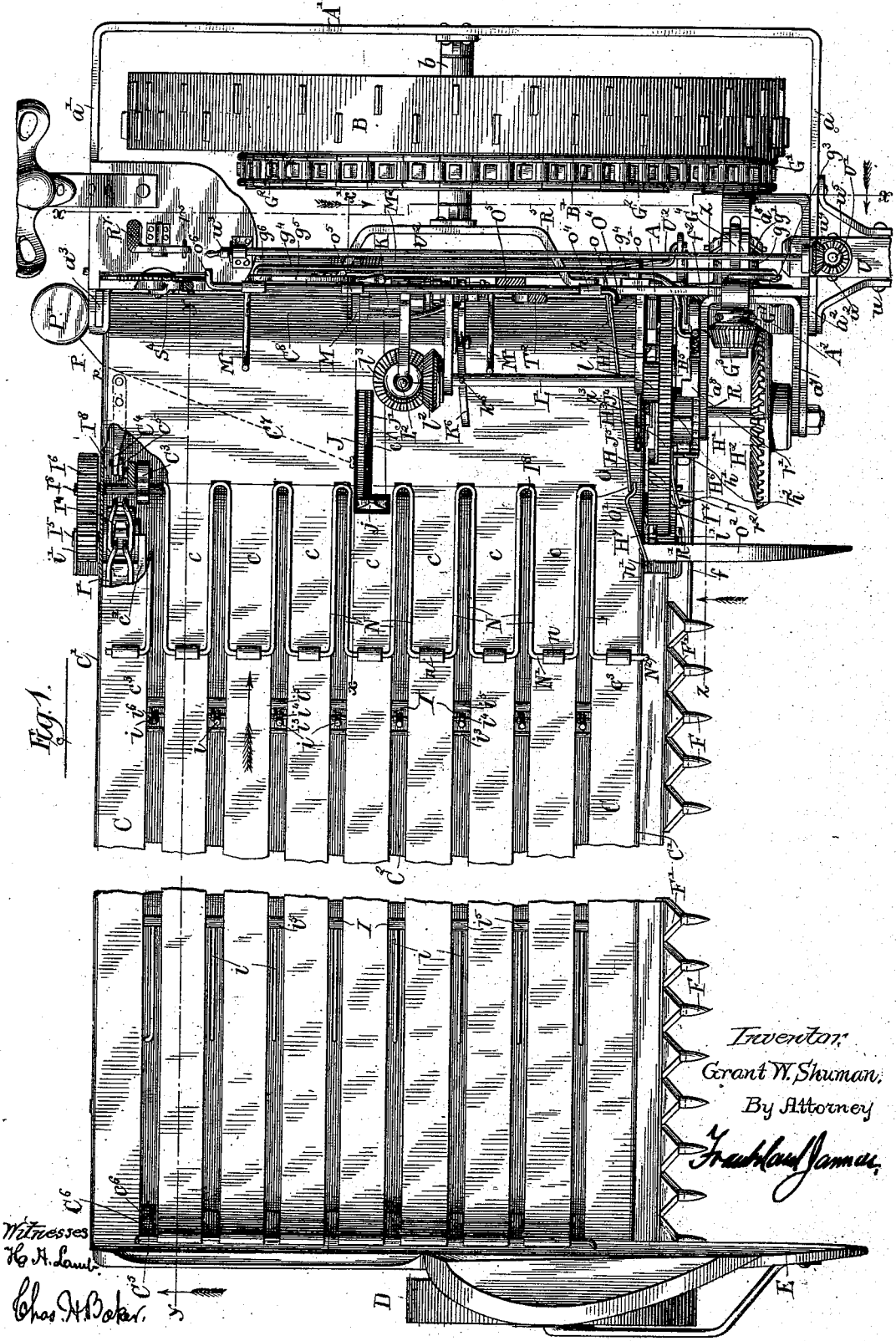
Witnesses
H. H. Lant
Chas. H. Baker
Inventor:
Grant W. Shuman,
By Attorney
Frushland James

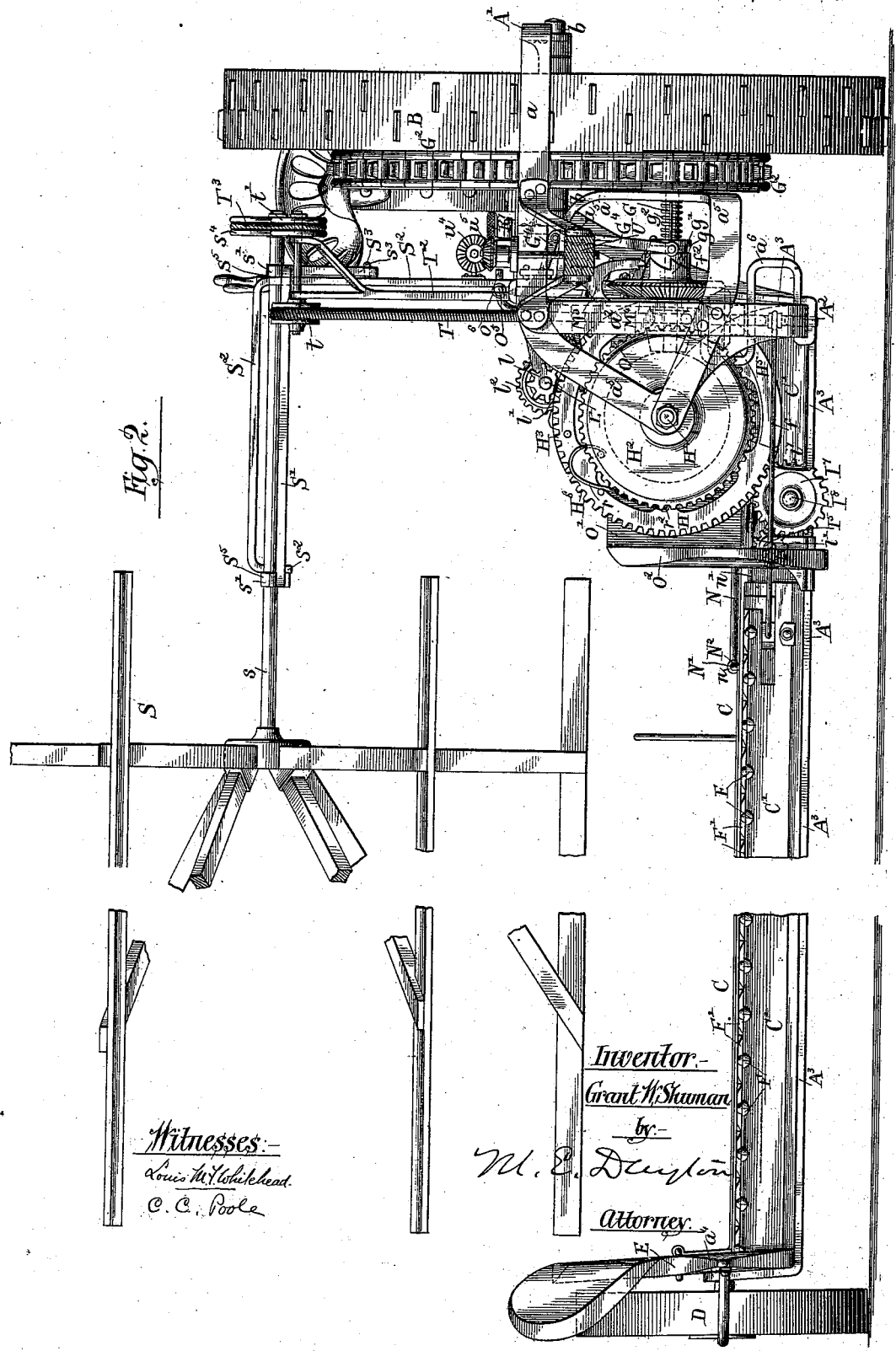

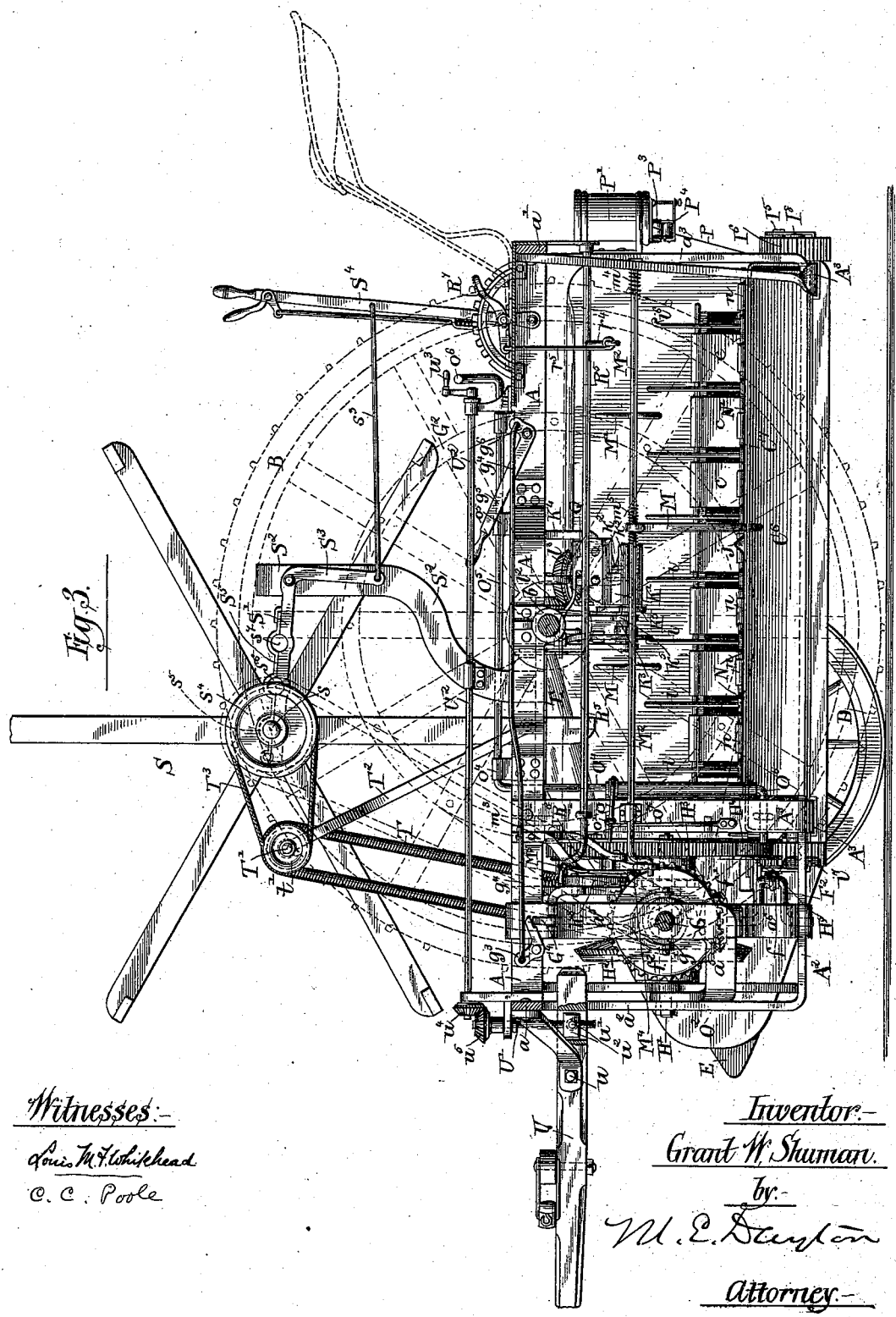

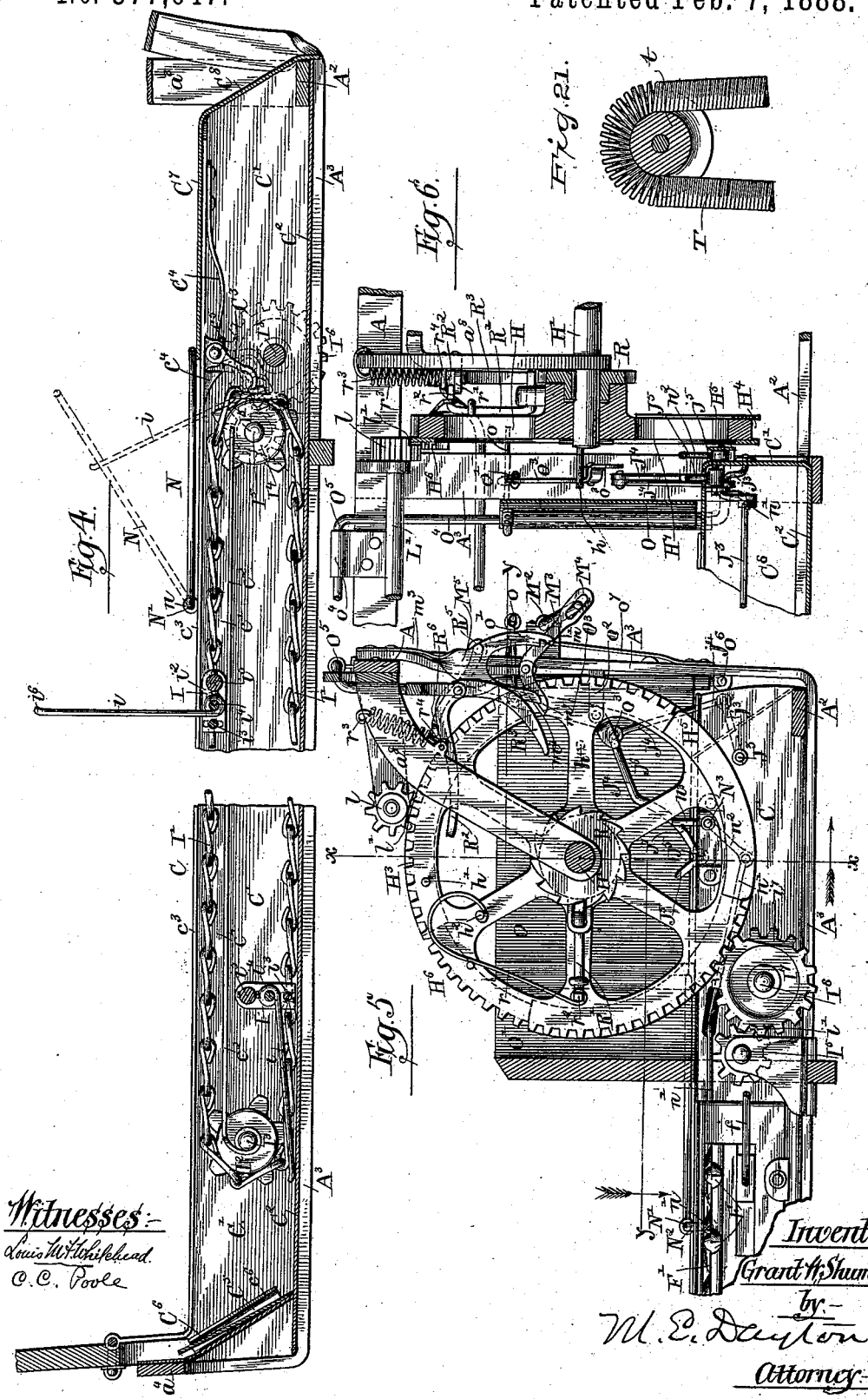

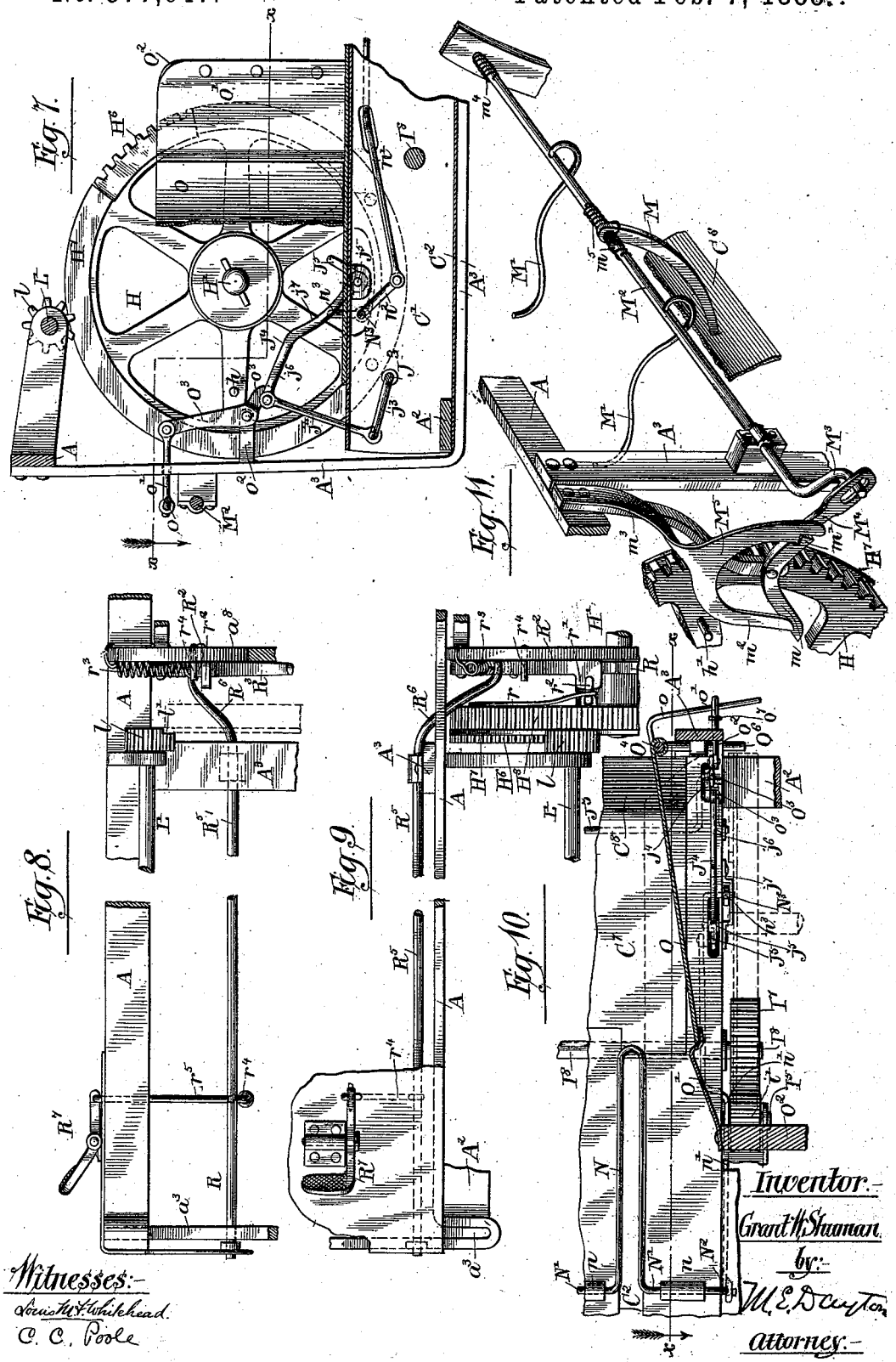

(No Model.) 6 Sheets—Sheet 6.
G. W. SHUMAN.
HARVESTER.
No. 377,647. Patented Feb. 7, 1888.
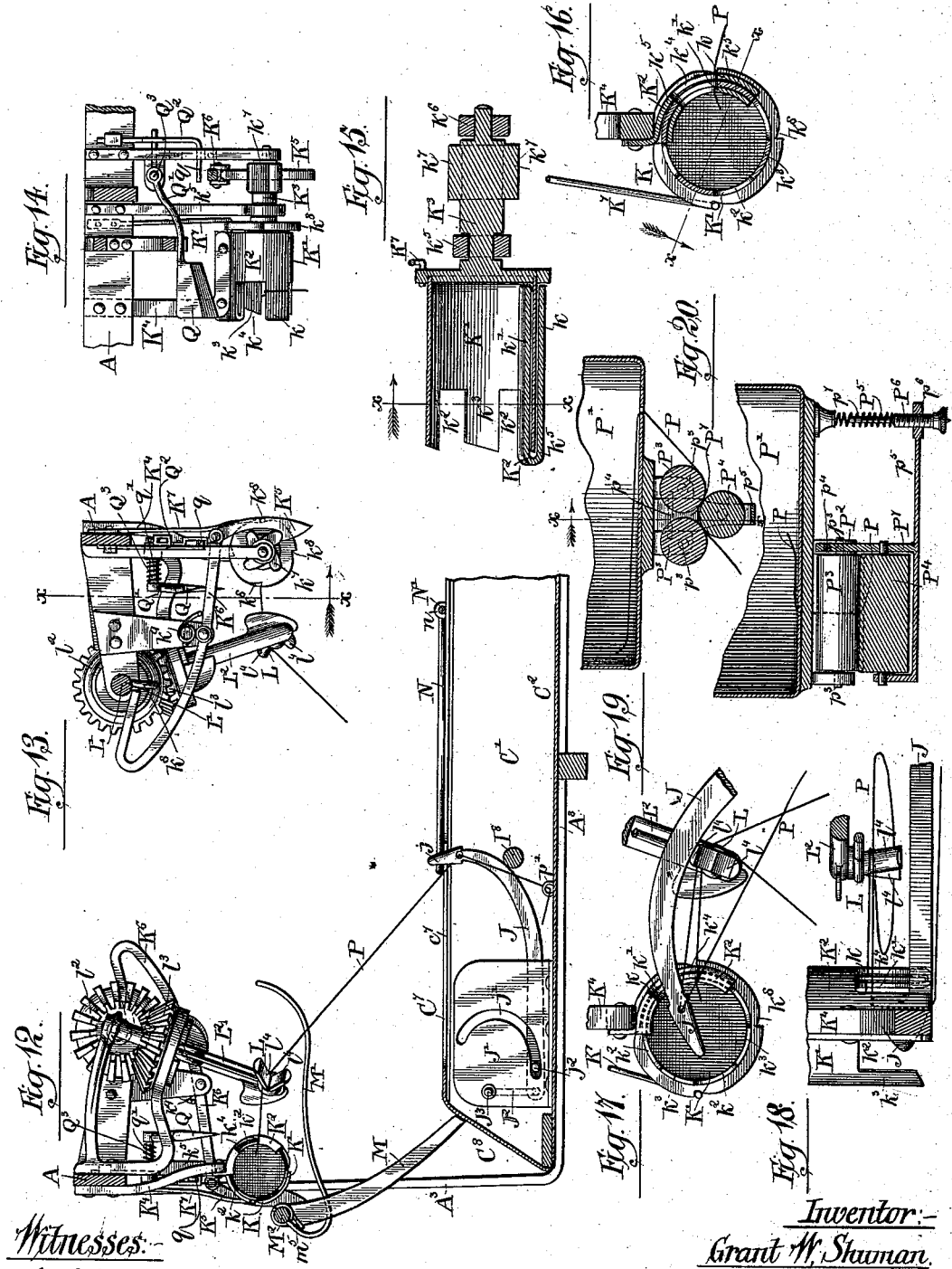
Witnesses:
Louis M. F. Whitehead.
C. C. Poole
Inventor:-
Grant W. Shuman.
by:-
M. E. Dayton
Attorney:-

UNITED STATES PATENT OFFICE.

GRANT W. SHUMAN, OF LAKE STATION, INDIANA.

HARVESTER.

SPECIFICATION forming part of Letters Patent No. 377,647, dated February 7, 1888.

Application filed October 19, 1885. Serial No. 180,316. (No model.)

*To all whom it may concern:*

Be it known that I, GRANT W. SHUMAN, of Lake Station, in the county of Lake and State of Indiana, have invented certain new and useful Improvements in Harvesters; and I do hereby declare that the following is a full, clear, and exact description thereof, reference being had to the accompanying drawings, and to the letters of reference marked thereon, which form a part of this specification.

The object of this invention is to improve the construction of harvesting-machines in several particulars, as will hereinafter appear.

The invention consists in the matters hereinafter described, and pointed out in the appended claims.

The machine herein shown as embodying my invention is a self-binding harvester belonging to that class of machines in which the grain is delivered horizontally from the grain-platform of the harvester to binding devices located inside of the driving-wheel, and which are generally known as "low-down" or "platform" binders. Certain of the improvements herein claimed are, however, applicable to other kinds of harvesters, as will hereinafter appear.

In the accompanying drawings, Figure 1 is a plan view of a harvester illustrating my invention. Fig. 2 is a front elevation of the same. Fig. 3 is a sectional end elevation taken inside of the main supporting-wheel upon line $x\,x$ of Fig. 1, looking toward the binding devices. Fig. 4 is a vertical longitudinal section through the grain-platform, looking toward the rear, said section being taken upon line $y\,y$ of Fig. 1. Fig. 5 is a vertical section taken upon line $z\,z$ of Fig. 1, looking rearwardly at the wheel by which the grain carrying and binding mechanisms are actuated. Fig. 6 is a detail vertical section of the parts shown in Fig. 5, taken upon line $x\,x$ of said figure. Fig. 7 is a detail vertical section taken upon line $x\,x$ of Fig. 10, viewing the wheel shown in Fig. 5 at the side thereof opposite to that shown in said figure. Fig. 8 is a detail side elevation showing separately from the other parts the wheel for driving the grain carrying and binding mechanisms, the clutch for connecting said wheel with the trip devices for actuating the clutch connecting the wheel which drives the grain carrying and binding mechanisms with its shaft, these parts being shown as viewed when looking toward the main driving-wheel. Fig. 9 is a plan view of the parts shown in Fig. 8. Fig. 10 is a sectional plan view taken upon line $y\,y$ of Fig. 5, showing more particularly the butt-evening devices. Fig. 11 is a detail perspective view of the rock-shaft carrying the bundle compressing and discharging arms and the parts immediately concerned in actuating it. Fig. 12 is a sectional view taken upon line $x'\,x'$ of Fig. 1, and looking toward the front of the machine, illustrating the bundle-compressing, knot-tying, and bundle-discharging devices. Fig. 13 is a detail sectional elevation of the twine gripping and tying devices, looking toward the rear. Fig. 14 is a sectional elevation of the parts shown in Fig. 13, taken upon line $x\,x$ of said figure. Fig. 15 is an enlarged longitudinal sectional view of the twine-gripping device, taken upon line $x\,x$, Fig. 16. Fig. 16 is a cross-section of the same, taken upon line $x\,x$ of Fig. 15. Fig. 17 is a detail view illustrating the position of the twine-carrying arm and twine holding and cutting devices when the arm is at the upper limit of its movement. Fig. 18 is a plan view of the same. Fig. 19 is a sectional view of the lower part of the twine-box and the tension device thereon. Fig. 20 is a central sectional view of the same, taken upon line $x\,x$ of Fig. 19. Fig. 21 is a detail view of an elastic belt shown in Figs. 2 and 3.

In the machine illustrated in the drawings, the main frame thereof comprises two parallel bars, A A', supporting the ends of the axle $b$ of the main supporting or driving wheel B, and connected by transverse bars $a\,a'$, a third bar, $A^2$, parallel with and below the bar A and connected therewith by uprights $a^2\,a^3$ at the front and rear of the machine, and parallel bars $A^3\,A^3$, sustaining the grain-platform C, attached to the bar $A^2$, and connected with each other at the outer end of the platform by a bar, $a^4$. The machine is provided with the usual divider, E, and grain-wheel D, which are supported by the bars $A^3$, $A^3$, and $a^4$, and also with the usual fingers, F F, and a cutter-bar, F', the latter being actuated by means of a pitman, $f$, from a vertically-arranged crank-shaft, $F^2$, actuated by means of bevel-gears $f'\,f^2$ from a horizontal shaft, G, by means of which other operative parts of the machine are also driven. The shaft G is mounted in frame-pieces $a^5$ $a^6$ at the forward part of the frame, and is provided with a sprocket-wheel, G', by means of which it is actuated from a sprocket-wheel, B', upon the wheel B, through the medium of a chain belt, $G^2$.

The shaft G is provided, also, with a beveled gear-wheel, $G^3$, meshing with a gear-wheel, $H^2$, upon a shaft, H', mounted in brackets $a^7$ $a^8$, and having upon its rear end a gear-wheel, H, by means of which the grain-carrying, bundle-compressing, knot-tying, and bundle-discharging devices are actuated, as will hereinafter appear. The wheels $G^3$ and $f^2$ upon the shaft G are both secured to a sleeve, $g$, adapted to rotate upon the shaft, and provided at its end with serrations or teeth engaging corresponding teeth upon a collar, $g'$, mounted to slide but not to rotate upon the shaft, and forming with said collar a clutch device by which the sleeve $g$ and wheels $f^2$ and $G^3$ may be engaged with and disengaged from the shaft to enable the operative parts to be disconnected from the driving-wheel in transporting the machine from place to place and in other circumstances.

The collar $g'$ is held in engagement with the sleeve $g$ by means of a spring, $g^2$, and the engaging-teeth upon the sleeve and collar are inclined, so as to allow the shaft G to run freely backward in a rearward movement of the machine. Means are herein shown for moving the collar $g'$ of the clutch from a point adjacent to the driver's seat, consisting of a bent lever, $G^4$, pivoted upon the frame and having a vertical arm forked at its lower end and connected with the collar by the familiar device of pins upon the forked arm engaging a groove in the collar, said lever $G^4$ having a horizontal arm engaged at its end with a bell-crank lever, $g^3$, Fig. 3, pivoted upon the frame-piece A and connected by means of a rod, $g^4$, with a hand-lever, $g^5$, pivoted upon the frame-piece A, near the rear end of the latter. The lever $g^5$ is constructed with a laterally-projecting part or arm, $g^6$, to the end of which the rod $g^4$ is connected, and the free end of which may be thrown to a point below the pivot of the lever, so as to lock the clutch in its disengaged position in a familiar manner.

In the machine herein shown the binding is accomplished at the end of the grain-platform adjacent to and inside of the main driving-wheel, and the bound bundles are delivered from the binding devices through a space between the driving-wheel and the end of the platform, the wheel B being set well out toward the outer frame-piece, A', to give space for the passage of the bundles. The binding devices are located over the portion of the grain-platform between its part upon which the grain falls and its inner end. This location and arrangement of the parts obviously give considerable space between the line of uncut grain and the driving-wheel, so that without crowding the horses upon the standing grain the pole may be located sufficiently inward from the wheel to equalize the resistance upon opposite sides of the pole and thereby prevent side draft.

The grain-platform C and the devices thereon for delivering the cut grain to the binding devices are constructed and operated as follows:

The grain-platform comprises vertical side pieces, C', longitudinal strips $c$, forming the upper horizontal grain-supporting surface of the platform, and a continuous horizontal bottom, $C^2$, located below the strips, and herein shown as made of sheet metal. The grain-carrying devices consist, essentially, of two horizontally-arranged endless chains, I' I', carrying rake-bars I I, located below the strips $c$ $c$ and provided with rake-fingers $i$ $i$, extending upwardly between the said strips, Fig. 4. The said chains are located one upon either side of the grain-platform, adjacent to the walls C' C' thereof, and are trained over sprocket-wheels $I^2$, mounted upon studs $I^3$, fixed in the walls C' at the outer end of the platform, and over sprocket-wheels $I^4$ upon short shafts $I^5$ $I^5$, mounted in bearings at either side of the inner end of the platform. The chains are actuated by means of pinions $i'$ upon the outer ends of the shafts $I^5$, which pinions intermesh with spur-wheels $I^6$ $I^7$ upon a shaft, $1^8$, which is driven by means of gear-teeth upon the periphery of the wheel H, intermeshing with the spur-wheel $I^7$ at the forward end of the shaft. The chains I' are driven in a direction to carry toward the binding mechanism the rake-bars and rake-fingers which are uppermost or adjacent to the strips $c$ $c$, and means are provided for holding the fingers vertically above the platform to gather the grain therefrom during their forward movement and for throwing them downwardly beneath the platform. For this purpose the rake-bars are pivotally connected with the chains, so that they may rotate freely therein, and their end portions are provided with parallel faces engaging horizontal guide-grooves $c'$ $c'$ upon the inner faces of the walls C' in such manner as to hold the fingers upright during their movement toward the binding devices, the pivotal connection of the bars with the chains permitting the fingers to fall when the bars are released from the grooves. In the particular construction of the parts shown the guide-grooves $c'$ $c'$ are formed by means of horizontal flanges $c^2$, attached to the walls C' C', adjacent to and below the outer strips, $c^3$ $c^3$, of the platform. As herein illustrated, also, the rake-bars comprise two end blocks, $i^2$, fitted to slide in the grooves $c'$ $c'$, and rods $i^4$ and $i^5$, connecting the said blocks and sustaining the fingers, a third rod, $i^3$, extending through the blocks and attached at its ends to the chains, being employed to form the pivotal connection with the latter.

The rake-bars are pivoted to the chain near their rear edges, (referring to their direction of motion,) the rod $i^3$ being for this purpose inserted through the rear ends of the blocks $i^2$. At the forward ends of the grooves $c'$, at the rear side of the platform, is placed a depending pivoted hook, $C^3$, located in position to engage the forward or free end of one of the blocks $i^2$ when the rake-bars reach the forward end of their movement, said hooks being constructed to hold the said free ends of the blocks, while their ends, which are connected with the chains, are carried downwardly around the wheels $I^2$, so as to throw the fingers backwardly and downwardly into a horizontal position, in the manner clearly indicated by the dotted lines in Fig. 4. A spring, $C^4$, is preferably applied to throw the free end of the hook toward the outer end of the platform, so as to hold it normally in position for engagement with the rake-bars. Said spring, by its action upon the hook, also tends to throw the free edge of the rake-bars upwardly as said rake-bars are carried bodily downward by the chain, and thereby insures a horizontal position of the fingers.

The downward movement of the free ends of the blocks $i^2$ into position to properly engage the hook $C^3$ is insured by a curved continuation, $c^4$, of the upper wall of the groove $c'$, and the free edge of the rake-bars may be made heavy, or weighted, as shown, to the same end. The spring $C^4$ may be applied in any suitable manner to the hook $C^3$, said spring being, as shown, made of leaf form, and engaged at its free end with an arm, $c^5$, rigidly attached to the hook adjacent to its pivot. When the rake-fingers are thrown downwardly into a horizontal position, as above described, they may conveniently rest and slide at their free ends upon the bottom $C^2$ of the platform as they are carried toward the outer end of the platform, as clearly shown in the drawings, Fig. 4.

For the purpose of again lifting the rake-fingers above the platform when they reach the outer end thereof, an inclined guide-surface, $C^5$, is provided, which is located in position to engage and lift the free end of one of the fingers $i$, so as to bring the blocks $i^2$ in position to enter the guide-grooves $c'$. The said guide-surface is shown in Fig. 1 as adapted to engage the rearmost finger, the latter being desirably provided with a short horizontally-bent part, $i^6$, for engagement with the said guide-surface. The said guide-surface, also, is preferably formed by a leaf-spring, $C^6$, attached to the machine at its lower end and free at its upper end, said spring being desirably located beneath a stationary guide-flange, $c^6$, between which flange and the spring the end $i^6$ of the finger travels as it moves upwardly upon the spring. The latter extends (at its free end) somewhat above the guide-flange, and is arranged to thrust the finger outwardly against the said flange at the upper part of the latter. By this construction it is obvious that when the part $i^6$ of the finger passes from the upper end of the guide-flange the upper end of the spring, which has been thrust backwardly by the said part $i^6$ of the finger, will fly forward into contact with the flange, thereby giving an upward and forward impetus to the fingers, tending to bring the blocks $i^2$ into position to enter the guide-grooves.

In the operation of the grain-carrying devices described the chains are moved intermittingly, so as to cause each set of rake-fingers to traverse the grain-platform in alternation, the motion of the fingers being arrested after the grain has been delivered to the binding devices, and the fingers being held stationary while the said binding devices are in operation. For this purpose the gear-teeth $H^3$ of the wheel H are extended only partially around the said wheel, leaving a vacant space, $H^4$, at one part of the rim of the wheel, so that the gear-wheel $I^7$ will become disconnected therefrom during a part of its revolution. The said wheel H is, as shown, provided at the part of its periphery at which the teeth are omitted with a delay-flange, $H^5$, adapted to engage a delay-surface, $i^7$, upon the gear-wheel $I^7$, so as to hold the latter from rotation while disengaged from the teeth, in a well-known manner. The parts are so proportioned and arranged that the fingers $i$ will traverse the platform once to each rotation of the wheel H, and the gear-wheel $I^7$ will become disengaged from the gear-teeth $H^3$, and the movement of the fingers will be stopped at the moment the latter reach the termination of their forward movement, the operation of the binding devices being timed to take place during the time, in the rotation of the wheel H, that the blank space $H^4$ therein is passing the wheel $I^7$, as will hereinafter more fully appear.

The binding devices comprise, generally, an oscillating needle or twine arm, J, Fig. 12, a twine-gripping device, (indicated as a whole by K,) a knotter, (indicated as a whole by L,) a compressor-arm, M, and discharging-arms M' M'. The grain is delivered by the rake-fingers $i$ upon a horizontal surface, $C^7$, forming a continuation of the grain-platform, and beneath which the twine-arm J is located when in its retracted position, said surface being provided with a slot, $c^7$, through which the said arm passes when raised. The grain is held in place at the end of the platform by the compressor-arm M, which is connected at its upper end with a horizontal rock-shaft, $M^2$, and rests at its lower end in contact with an inclined surface, $C^8$, forming a continuation of the surface $C^7$, and over which the bundles are discharged. The discharging-arms M' are also connected with the shaft $M^2$, said arms extending over the surface $C^7$ in such manner as to prevent the grain delivered upon the said surface from rising into contact with the knot-tying devices, as clearly shown in Figs. 11 and 12. The twine-arm J, which is movably supported adjacent to the end of the platform, extends, when in its retracted position, to a point beyond the rake-fingers $i$ when the latter are at the forward limit of their movement, so that when said arm is thrown upwardly to compress the bundle its point or head $j$ will pass outside of the fingers and the mass of grain held thereby.

The means for supporting and moving the twine-arm herein shown consist of two parallel stationary plates, J', Fig. 12, provided with curved or cam slots $j'$, which are engaged by pins $j^2$ in the arm J, and a crank, J², engaged with the end of the arm and connected with a rock-shaft, J³, mounted in suitable bearings in the frame. The slots $j'$ are curved in such manner that when the crank is moved the head of the twine-arm will, instead of moving in a circular curve, take a course first in a direction nearly upward, and after it has passed above the fingers will move nearly in a horizontal direction until it reaches the knotting device.

The oscillatory movement of the shaft J³ for moving the arm J in the manner described is produced as follows: The said shaft J³, at its forward end and at a point adjacent to the wheel H, Figs. 5, 7, and 10, is provided with a horizontally-arranged crank-arm, $j^3$, connected at its outer end, by means of a pitman, $j^4$, with the free end of a bent rod or bar, J⁴, pivoted at J⁵ to the machine-frame and located in the path of a pin, $h$, in the wheel H, in such manner that when engaged by the said pin the free end of the bar will be depressed, thereby throwing downwardly the crank-arm $j^3$, so as to give a partial rotation to the shaft in a direction to throw the head of the twine-arm upwardly. The bar J⁴ is made straight in its portion $j^6$ adjacent to its free end, and is curved in its part $j^7$, from a point near its middle to its pivotal point, upon a circular curve having the same radius as the circle described by the pin $h$, the parts being so arranged that the bar will be depressed to actuate the twine-arm while the pin $h$ is passing over the outer part, $j^6$, of the bar, and will be held immovably in its depressed position during the passage of the pin over the curved part $j^7$ during the time that the knotting devices are in operation. The bar J⁴ is provided near its pivotal point with a short upwardly-directed rigid arm, J⁵, which is engaged and moved by the pin $h$ at the moment the latter passes from the curved part of the bar, whereby the free end of the arm J⁴ is thrown upwardly and the twine-arm thereby retracted.

N, Figs. 1, 2, 4, 5, 10, and 12, are a series of fingers attached to a rock-shaft, N', extending across the grain-platform, over the strips $c$, near the binding devices, said fingers being constructed to rest normally in a horizontal position upon the platform, with their free ends directed toward the binding devices. The said fingers and rock-shaft, as herein shown, are formed of a single metal bar or rod bent to form double fingers, and having bearings at $n$ between the fingers upon the strips $c$. The said rock-shaft is provided at its forward end with a depending arm, N², which is connected, by means of a horizontally-arranged pitman, $n'$, with a depending arm, $n^2$, upon a rock-shaft, N³, provided with an upwardly-directed arm, $n^3$, located in the path of the pin $h$, the parts being so arranged that when the said arm $n^3$ is encountered by the pin the rock-shafts N³ and N' will be partially rotated in a direction to lift the free ends of the fingers N from the grain-platform. The purpose of the fingers N is to prevent interference with the downward movement of the rake-fingers $i$ by the presence of grain upon the platform behind them; and for this purpose the said fingers N are raised into an inclined position, as indicated by dotted lines in Fig. 4, prior to the downward movement of the said rake-fingers, so as to lift from the platform the grain which has fallen thereon behind the said rake-fingers during the time that the latter are held stationary, and thereby allow the said rake-fingers to fall freely backward and downward between the strips $c$.

For the purpose of evening the butts of the grain, after the latter has been delivered to the binding devices, means are herein provided, as follows:

O is a vertically-arranged oscillating hinged flap, located at the forward end of the surface C and pivotally supported at its vertical margin adjacent to the inner edge of the said surface. Said flap, as clearly shown in Figs. 1 and 10, stands normally in a position inclined forwardly and outwardly from its pivotal axis, with its free end in contact with a stationary guide-plate, O', located upon the front edge of the grain-platform, adjacent to the inner end of the latter, and attached to the rear edge of the inner guard finger or divider, O². The said flap is actuated by having its free edge swung outwardly or rearwardly until the face of the flap is parallel with the front edge of the grain-platform, this movement taking place after the grain has been delivered upon the grain-supporting surface C⁷ and before the twine-arm has advanced to compress the bundle.

The devices herein shown for actuating the flap are constructed as follows: The said flap is provided near its upper edge with a bent arm, $o$, extending outwardly from its pivotal axis and having its end portion directed forwardly and generally at right angles with the face of the flap, Figs. 3, 5, 7, and 10. The said forwardly-bent part of the arm $o$ is engaged with an eye or loop in a connecting-rod, $o'$, which is joined with the upper free end of a lever, O³, pivoted near its lower end to an arm, $o^2$, upon the machine-frame, Fig. 7, said lever O³ being provided with an arm, $o^3$, directed inwardly, or toward the center of the wheel H, and into the path of the pin $h$ in said wheel. The free edge of the flap is held in its retracted position by means of a spring, $o^7$, herein shown as applied to the rod $o'$. Upon contact of the said pin $h$ with the arm $o$ the upper end of the lever O³ will be thrown laterally, thereby moving the arm $o$ and swinging the free end of the flap O into a position parallel with the front edge of the grain-platform, the movements of the parts being so timed that the pin will strike the lever O³ at the moment after the rake-fingers $i$ have reached the end of their movement and before the said pin $h$ encounters the bar $J^4$, by which the twine-arm is actuated.

To enable the evener to be adjusted in position for long or short grain, the flap O is pivoted upon a vertical bar, $O^4$, which is supported in such manner as to be horizontally movable upon the machine-frame, the supporting devices therefor herein shown consisting of horizontal parts $O^5$ $O^6$ upon the said bar, having sliding bearings at $o^4$ $o^5$ upon the machine-frame, Fig. 3. To enable the said bar to be conveniently moved from the driver's seat, the upper horizontal part, $O^5$, thereof is preferably extended rearwardly, as shown, and provided at its rear end with a handle, $o^6$. The knotting device L herein shown is of that class which is adapted to form a loop in the doubled part of the twine between the bundle and the gripping device. The said knotter L is actuated by means of a horizontal shaft, L', located in suitable bearings upon the machine-frame and provided at its forward end with a pinion, $l$, Figs. 1, 2, 5, 6, 7, 8, and 9, intermeshing with a gear-segment, $H^6$, upon the wheel H, the latter being provided upon its side adjacent to the said gear-segment $H^6$ with a guide-flange, $H^7$, engaging a guide-surface, $l'$, upon the pinion $l$, so as to hold the latter from rotation except when engaged with the gear-segment in a well-known manner. The said shaft L' is provided, also, with a beveled gear-wheel, $l^2$, intermeshing with a similar gear-wheel, $l^3$, by which the knotter is directly actuated, said wheel being mounted upon a short shaft, $L^2$, carrying at its lower end the gripping-jaws $l^4$ $l^4$, which operate in tying the knot.

The twine holder or gripper K comprises an intermittingly-revolving hollow cylinder, K', open at one end and operating in connection with a partial cylindric housing or shell, $K^2$, having connected inner and outer walls, $k$ and $k'$, between which latter the part of the hollow cylinder K' adjacent to its open end is located. The said cylinder K' is provided at its open end with notches $k^2$, forming projections or teeth $k^3$, and the shell $K^2$ with a notch, $k^4$, forming projections $k^5$, corresponding in position with two of the teeth $k^3$ of the cylinder K'. The cylinder K' is attached at its end opposite to that at which the teeth $k^3$ are formed to a shaft, $K^3$, having bearings in brackets $k^5$ $k^6$ upon the machine-frame, and the inner and outer parts, $k$ $k'$, of the shell $k^2$ are connected at the open end of the cylinder K', the said shell being sustained from the frame-piece A by means of a stationary arm, $K^4$.

The cylinder K' is revolved intermittingly, in the operation of the binding devices, by means of a pawl, $K^5$, engaging ratchet-teeth $k^7$ upon the shaft $K^3$, said pawl being hung upon a vibrating lever, $K^6$, actuated by means of a spring, $k^9$, in connection with an arm or projection, $k^8$, upon the rotating shaft L', by which the knotter L is actuated, Fig. 13. To prevent any backward movement of the cylinder, after each partial rotation by the action of the pawl, a spring-detent, $K^7$, is employed, which engages at its free end notches $k^9$, formed in a flange upon the said cylinder.

The cylinder K' is arranged to stand usually with one of the notches therein opposite the notch $k^4$ in the shell $K^2$, and said cylinder is turned at each movement of the lever $K^6$ and pawl $K^5$ a distance equal to the distance apart of the teeth $k^3$, so as to carry one of the latter past the said notch $k^4$ and bring the next notch of the cylinder into register therewith. In the particular construction shown the cylinder is provided with four teeth, and is turned one-fourth of a revolution at each movement; but the cylinder may obviously be provided with a greater or less number of teeth with practically the same results.

The head $j$ of the twine-arm J is constructed to project laterally from the twine-arm, as clearly shown in Figs. 1 and 18, and the twine P, which is carried from a box or holder, P', upon the frame through guides $p$ and $p'$ to the end of the twine-arm, is inserted through a transverse passage or eye in the head $j$ and emerges from the head at a part of the latter remote from the arm, so that the twine is carried around the bundle in a plane at one side of the arm. The notch $k^4$ in the shell $K^2$ is located in such position that when the arm is thrown upwardly the projecting part of the head will pass through the notch and rest within the open end of the cylinder. When the arm is in this position, the twine carried around the bundle will lie within or extend through the said notch, and when the cylinder is rotated so as to carry one of the teeth $k^3$ thereof across the notch, the twine will be carried by the tooth between the walls $k$ $k'$ of the shell, and thereby firmly gripped, so that after the twine has been severed at a point between the gripping device and the knotter the end of the twine adjacent to the twine-arm head will be held in the gripper during the backward movement of the arm and until it is again advanced and another knot is tied.

The cutting device herein shown consists of a knife, Q, mounted upon an oscillating lever, Q', and constructed to operate in connection with the lower edge of the notch $k^4$ in the outer wall, $k$, of the shell $K^2$ in cutting the twine, Figs. 12 and 14. Said lever Q' is operated by means of the lever $K^6$ through the medium of a vertically-sliding bar, $Q^2$, engaged with the lever Q', Figs. 12, 13, and 14, and provided with an arm, $q$, located in position to engage the said lever $K^6$, the knife Q being held at the upper limit of its movement by means of a spring, $q'$, applied to the lever Q', and thrown downwardly by the action of the lever $K^6$ and the slide $Q^2$. The said spring $q'$, as herein shown, is of spiral form, and placed about a rock-shaft, $Q^3$, supporting the lever Q', Fig. 13.

The arms M' are actuated for discharging the bundle by partially rotating the rock-shaft $M^2$, so as to throw the said arms downwardly and outwardly, while at the same time throwing outwardly the compressor-arm M, mounted upon the same shaft. The means shown for actuating said rock-shaft are as follows: Upon the forward end of the said rock-shaft is a crank-arm, $M^3$, Figs. 5 and 11, which engages the end of a lever, $M^4$, pivotally supported upon the machine-frame, and provided with an arm, $m$, extending over the outer or forward face of the wheel H in the path of a pin, $h'$, upon said wheel, a spring, $m^4$, being applied between the rock-shaft and the frame to hold the arm $m$ in position for engagement with the said pin $h'$. In order to hold the shaft from rotary movement under the outward pressure upon the compressor-arm occuring during the compression of the bundle, a spring-detent, $M^5$, is arranged upon the frame in position to engage a projection, $m'$, upon the lever $M^4$, and to hold the latter from upward movement, said detent being provided with an arm, $m^2$, extending inwardly over the arm $m$ of the said lever $M^4$, and in position to be encountered and moved by the pin $h'$ before the latter reaches the said arm $m$, whereby the detent will be disengaged from the lever, to permit the latter to be moved at the proper time. In the particular construction of the detent $M^5$ shown it is made of a single piece of metal, and is provided with a part or arm, $m^3$, attached at its end to the frame and forming a spring to allow the movement of the detent.

The compressor-arm M is preferably mounted to rotate upon the rock-shaft $M^2$, and is held in operative position by means of a coiled spring, $m^5$, applied between the shaft and the arm, whereby the latter may yield under excessive pressure, and breakage of the parts may be thereby prevented. The inward movement of the free end of the arm under the action of the spring may be conveniently limited by constructing said arm to rest against the inclined surface $C^8$ at the inner end of the grain-platform, as clearly shown in Fig. 12.

In the operation of the raking and binding devices above described each set of rake-fingers is, as before stated, moved intermittingly to carry the grain to the binding devices, and after each movement of the said fingers across the platform the binding devices are actuated to compress and tie the grain into a bundle and to discharge the latter from the machine. For the purpose of actuating the several parts in the manner described, the segmental or mutilated gear $H^6$ upon the wheel H is arranged in such relation to the segmental gear $H^3$ thereon, by which the shaft $L'$ is driven, and to the pins $h$ and $h'$, that as soon as the set of rake-fingers traversing the platform has reached the end of its movement, and has been stopped by the engagement of the guide-flange $H^5$ with the gear-wheel $I^7$, the pin $h$, striking the bar $J^4$, will throw upwardly the twine-arm, and when the twine-arm has reached the upper limit of its movement the rotation of the shaft $L'$, to actuate the twine gripper, cutter, and knotter, will immediately follow, and as soon as the said devices have come to rest the rock-shaft $M^2$ will be actuated by the pin $h'$ to discharge the bundle, all of these several operations taking place before the grain-carrying fingers again begin to move. One important advantage of the construction described, whereby the raking, compressing, knot-tying, and bundle-discharging devices are separately and successively actuated, is that an equalization of the power required to operate the machine is thereby obtained.

The wheel H, by which the several operative parts above described are driven, instead of being fixed upon the shaft $H'$, is preferably connected therewith by a clutch mechanism constructed to become disengaged at the termination of each revolution of the wheel and after the discharge of the bundle, said clutch mechanism being connected with a point near the driver's seat by devices whereby the clutch may be re-engaged and the grain-carrying devices started when sufficient grain has accumulated upon the platform to make a bundle of the proper size. The clutch connecting the wheel H with the shaft $H'$ consists of a serrated or notched collar, R, fixed upon the shaft $H'$, and a radially-movable part or detent, $R'$, upon the wheel constructed to engage the teeth of the collar at its inner end, and held normally in engagement therewith by means of a spring, $r$, applied between the wheel and detent for this purpose.

The means for automatically disengaging the detent $R'$ from the collar R at the termination of each revolution of the wheel consists of a bent lever, $R^2$, pivoted upon the machine-frame and provided upon its end with a laterally or inwardly projecting part, $r'$, Figs. 2 and 6, adapted to engage the upper outturned horizontal end, $r^2$, of the detent $R'$, and having a short arm, $R^3$, extending into position for engagement with a pin, $h^2$, upon the wheel H. The lever $R^3$ is sustained in a nearly-horizontal position by means of a spring, $r^3$, a stop, $r^4$, being placed upon the bracket $a^8$ in position to limit the upward movement of the lever. The pin $h^2$ upon the wheel H is so located with reference to the detent $R'$ that said pin, in the rotation of the wheel, will strike the arm $R^3$ of the lever $R^2$ (so as to swing it downwardly and depress the free end of the said lever) shortly before the horizontal part $r^2$ of the detent reaches the said projection $r'$, the free end of the lever being thrown downwardly sufficiently to allow the part $r^2$ of the detent to pass above the projection $r'$ thereon. The parts are so arranged that the pin $h^2$ passes from the arm $R^3$, and thereby releases the lever $R^2$ and allows it to be thrown upwardly by the spring at the moment the said part $r^2$ of the detent reaches a point immediately above the projection $r'$ on said lever, whereby in the upward movement of the lever the detent is released from the collar R and the wheel H thereby disengaged from its shaft. To enable the parts of the machine driven by the wheel H to be started when desired, means are provided connecting the lever R² with a point near the driver's seat, whereby the free end of the lever may be depressed and the detent allowed to engage the collar R. The devices for this purpose herein shown consist of a rock-shaft, R⁵, having bearings upon the machine-frame and extending rearwardly from a point adjacent to the wheel H to one near the driver's seat, said rock-shaft being provided with an arm, R⁶, resting at its free end upon the lever R², so that by the turning of the shaft the lever may be depressed. The said shaft is provided near its rear end with a horizontal arm, $r^4$, Figs. 8 and 9, connected by a pitman, $r^5$, with a foot-lever, R⁷.

P² is an improved tension device for the twine, herein shown as attached to the bottom of the twine-holder P'. This device consists of two rollers, P³ P³, mounted in stationary bearings $p^3 p^3$, and a third roller, P⁴, which is bodily movable toward and from the other rollers and is held yieldingly and adjustably in contact therewith by a spring, P⁵, and adjusting-screw, P⁶, applied to its supporting-frame P⁷. The twine P is passed between the roller P⁴ and the rollers P³ P³, and the said rollers being held from rotating freely by the frictional resistance to rotation on their pivots due to their being pressed forcibly together, the twine will be subjected to a tension depending upon the pressure applied for this purpose. In the particular construction shown the frame P⁷ is pivoted at $p^4$ between the bearings $p^3 p^3$ at one end of the rollers P³, and the roller P⁴ is moved by swinging said frame about its pivotal axis, the said frame being provided with an arm, $p^5$, engaged at its outer portion, $p^6$, with the set-screw P⁶, which is constructed to bear at its inner end against the spring P⁵, which is herein shown as made of spiral form and located between the end of said set-screw and the stationary part or base of the tension device. The said set-screw is desirably provided at its inner end with an axial prolongation, $p^7$, to sustain the spring in place. By the construction set forth the spring P⁵ operates to thrust the arm $p^5$ outwardly or downwardly, and thereby force the roller P⁴ into contact with the rollers P³ P³, while the set screws P⁶, by enabling the distance between the bearing points of the spring to be changed, allow the pressure of the rollers to be varied, as desired.

An improved construction in means for adjustably supporting and driving a grain-reel is herein shown, and is as follows:

S is the grain-reel, which is provided with a shaft, s, mounted in suitable bearings, s' s', upon a swinging frame, S', pivotally connected with a stationary reel-support, S², herein shown as formed by means of a metal bar attached to the frame-piece A of the machine, and bent at its upper part horizontally and then downwardly to form two bearings, $s^2 s^2$, for the said frame. Said frame S' is pivoted at its rear end to the support S², so that when its free forward end is moved up or down the reel will be bodily raised and lowered, the frame being provided with a depending rigid arm, S³, connected at its lower free end, by means of a pitman, $s^3$, with a hand-lever, S⁴, provided with the usual locking devices, whereby the said lever and the reel may be placed and held in any desired position.

The reel, movably supported, as described, is driven from a grooved pulley, G⁷, upon the shaft G by means of an elastic endless belt or band, T, formed of a spirally-coiled wire or spring, whereby the belt will elongate and contract as the distance between the driving-pulley and the reel-shaft is increased or decreased in adjusting the reel. This belt is more clearly shown in the detail view Fig. 21. On account of features of construction in the frame present in the particular machine illustrated, the belt T, instead of extending directly from the driving-pulley G⁷ to a pulley upon the reel-shaft, is trained at its upper end over a pulley, t, upon a shaft, T', which is mounted upon a swinging arm, T², pivoted at its lower end to the frame-piece A, and said shaft is provided with a second pulley, $t'$, from which the reel-shaft is driven by means of a belt, T³, passing over the said pulley $t'$, and a pulley, $s^4$, upon the reel-shaft. When the frame S' is moved in this construction of the parts, the arm T² will obviously be swung about its pivot by means of the belt T³, and the belt T will be lengthened and shortened as the arm and pulley $t$ are moved. The construction in which the belt T passes directly from the driving-pulley to a pulley upon the reel-shaft is shown in dotted lines in Fig. 3, this construction being one which will preferably be used in practice.

As herein shown, the frame S' is provided with a series of bearings, $s^5 s^6 s^7$, in either of which the shaft s of the reel may be held, in order to enable the reel to be adjusted forwardly and backwardly with reference to the cutters, this adjustment also being permitted by the flexible belt T. In the particular construction illustrated, the bearings $s^5, s^6$, and $s^7$ are formed partially in the metal of the frame S' and partially in bars $s^5$, removably attached thereto, so as to enable the position of the reel-shaft to be readily changed when desired.

To provide means for changing the angle in a vertical plane of the tongue or pole U with reference to the machine-frame, in order to enable the cutters to be raised or depressed to cut a greater or less distance above the ground, said pole is, as herein shown, connected by a horizontal pivot, u, with the machine-frame, and is engaged at a point somewhat distant from the pivot with a vertical screw-shaft, U', held from vertical movement by a suitable bearing upon the frame, and adapted to be rotated so as to swing the outer end of the pole up or down, as desired. In the preferable construction of the said adjusting device illustrated, the shaft U' engages a nut, u', located in a recess in the pole at the rear of the pivot u and pivoted to swing about a horizontal transverse axis by means of pivot-pins $u^2$, Fig. 1, the bearing of the screw-shaft upon the frame being constructed to allow the necessary slight tilting movement in the shaft. To enable the screw-shaft U' to be actuated by the driver without leaving his seat, a horizontal shaft, $U^2$, may be provided, having suitable bearings upon the frame of the machine, and provided upon its rear end with a crank, $u^3$, and upon its forward end with a beveled gear, $u^4$, intermeshing with a similar gear, $u^5$, upon the shaft U'.

I am aware that a binder has heretofore been made comprising a horizontal grain-platform, a curved surface or receptacle located at one end of the platform, above the level of the latter, for holding the grain while being bound, a rake delivering the cut grain to the end of the platform adjacent to the binding devices, and a series of oscillating arms, and a twine arm or needle pivoted at the edge of the grain-receptacle and adapted to swing downwardly below the top surface of the platform to allow the grain to be covered over them by the rakes, and constructed to be swung upwardly, so as to lift and carry the said grain into the binding-receptacle and compress it in the latter. The construction of these parts of the binding devices herein shown, and set forth in claim 1, differs from that above referred to in having the surface upon which the grain is held while being bound upon a level with the grain-platform, and the twine-arm pivoted to rotate about an axis below said surface, so that the grain is delivered directly to the said surface by the rakes, and the arm operates to thrust backwardly and compress the grain while the latter is upon the said surface without lifting or bodily moving said grain, with obvious advantages in point of simplicity of construction and compactness of the parts.

I claim as my invention—

1. The combination, with the grain-platform, the finger-bars I, provided with fingers $i$, and belts I', of an inclined guide-surface for the ends of the fingers formed by a spring, $C^6$, and a stationary guide-flange, $c^6$, substantially as described.

2. The combination, with the finger-bars I, provided with fingers $i$, the belts I', wheels $I^2$ $I^4$, supporting the belts, and oscillatory guard-fingers N, of means for actuating said parts, comprising a wheel, H, provided with a partial gear, $H^3$, and with a guide-flange, $H^5$, and a pin, $h$, a shaft, $I^8$, having operative connection with the belt-wheels $I^4$, and provided with a gear-wheel, $I^7$, intermeshing with the gear $H^3$, and provided with a guide-surface, $i^7$, a rock-shaft, $N^3$, provided with arms $n^3$ and $n^2$, a rock-shaft, N', supporting said guard-fingers, provided with an arm, $N^2$, and a rod connecting the arm $N^2$ with the arm $n^2$, substantially as described.

3. The combination, with the twine-arm J, of means for actuating said arm, comprising a rock-shaft, $J^3$, provided with a crank, $J^2$, engaged with the said arm, bearing-pins $j^2 j^2$, secured in said arm between its point of engagement with the crank and its free end, two stationary parallel plates provided with cam-slots engaged by said pins, and means giving an oscillatory motion to said shaft, substantially as described.

4. The combination, with the twine-arm J, of means for supporting and actuating said arm, comprising pins $j^2$ in the said arm, two parallel stationary plates provided with cam-slots engaged by the said pins, a rock-shaft, $J^3$, provided with a crank, $J^2$, engaged with the said arm and with a crank-arm, $j^3$, a rod or bar, $J^4$, pivoted upon the machine-frame and connected at its free end with the said crank-arm $j^3$, and a revolving wheel, H, provided with a pin, $h$, located in position to engage the said bar, substantially as described.

5. The combination, with the twine-arm J, provided with pins $j^2$, of two parallel stationary plates, J', provided with cam-slots engaged by the said pins, a rock-shaft, $J^3$, provided with a crank, $J^2$, engaged with the said arm, and also with a crank arm, $j^3$, a rod or bar, $J^4$, pivoted upon the machine-frame and connected at its free end with the said crank-arm $j^3$, and a revolving wheel, H, provided with a pin, $h$, located in position to engage the said bar, the latter being provided near its pivotal point with an arm, $J^5$, also adapted for engagement with the pin $h$, substantially as described.

6. The combination, with the twine-arm J, provided with pins $j^2$, of two parallel stationary plates provided with cam-slots engaged by the said pins, a rock-shaft, $J^3$, provided with a crank, $J^2$, engaged with the said arm, and also with a crank-arm, $j^3$, a rod or bar, $J^4$, pivoted upon the machine frame and connected at its free end with the said crank-arm $j^3$, and a revolving wheel, H, provided with a pin, $h$, located in position to engage the bar, said bar being provided with a straight part, $j^6$, and a curved portion, $j^7$, substantially as described.

7. The combination, with the grain-platform and with binding devices comprising a grain-supporting surface, $C^7$, of a stationary inclined guide-plate, O', located near the forward edge of the grain-platform, and a butt-evener comprising an oscillating flap pivoted at its vertical edge at one side of the said surface and resting at its free edge in contact with the said guide-plate O', substantially as described.

8. The combination, with the oscillating flap O, supported upon an axis which is movable upon the machine-frame, of means for actuating the flap, comprising an arm, $o$, attached to the flap, a revolving wheel, H, provided with a pin, $h$, a lever, $O^3$, located in position for engagement with the pin $h$, and a connecting-rod, o', attached to the lever $O^3$, and having sliding connection with the arm $o$, substantially as described.

9. The combination, with the knotter L and the twine-arm J, of means for actuating said knotter and twine-arm, consisting of a shaft, L′, provided with a pinion, $l$, an oscillating shaft, J³, carrying the twine-arm and provided with a crank-arm, $j^3$, a bar, J⁴, pivoted at one end upon the machine-frame, a bar, $j^4$, connecting the free end of said bar J⁴ with the crank-arm $j^3$, and a wheel, H, provided with a gear-segment, H⁶, engaged with the pinion $l$, and having a pin, $h$, located in position to engage said bar J⁴, substantially as described.

10. The combination, with a twine-arm, J, provided with a laterally-projecting head, $j$, and a knotter, of a twine-gripper comprising a hollow revolving open-ended cylinder, K′, provided with notches $k^2$, and a stationary notched cylindric housing or shell, K, having connected inner and outer walls, $k$ and $k'$, said cylinder being arranged with its axis of rotation parallel with the axis of rotation of the twine-arm, whereby the projecting head $j$ may pass through the notches and thereby bring the twine into position to be gripped by the gripping device, substantially as described.

11. The combination, with the twine-arm and gripping device, comprising a hollow open-ended notched revolving shell, K′, and a casing, K², having connected inner and outer walls, $k$ $k'$, and provided with a notch, $k^4$, of a twine-cutter consisting of an oscillating knife, Q, operating in connection with the lower margin of the notch $k^4$ in the outer wall, $k$, of the shell K², substantially as described.

12. The combination, with the gripping device comprising a shell, K′, a casing, K², a revolving shaft, K³, sustaining the shell K, and provided with ratchet-teeth $k^7$, a pawl, K⁵, and a vibrating lever, K⁶, supporting the pawl, of a twine-cutter comprising a knife, Q, an oscillating lever, Q′, supporting the knife, a spring, $q'$, applied to throw the knife upwardly, and a vertically-sliding bar, Q², engaged with the lever Q′, and provided with an arm, $q$, located in the path of the lever K⁶, substantially as described.

13. The combination, with the bundle-discharging arms M′ and rock-shaft M², sustaining said arms, of means for actuating the arms, comprising a crank-arm, M³, upon the rock-shaft, a lever, M⁴, pivoted upon the machine-frame and engaged with the said crank-arm, a wheel, H, provided with a pin, $h'$, located in position to engage and actuate the said lever M⁴, and a spring-detent, M⁵, engaging the lever M⁴, and provided with an arm, $m^2$, extending into the path of the pin $h'$, substantially as described.

14. The combination, with the bundle-discharging arms M′, and rock-shaft M², sustaining said arms, and provided with a crank-arm, M³, of a lever, M⁴, pivoted upon the machine-frame and engaged with the crank-arm, a revolving wheel, H, provided with a pin, $h'$, located in position to engage and actuate said lever M⁴, a spring, $m^4$, applied to hold the lever M⁴ in position for engagement with the pin $h'$, and a spring-detent, M⁵, engaging the said lever and the pin $h'$, substantially as described.

15. The combination of the rock-shaft M², the compressor-arm M, having yielding connection with the shaft, the discharging-arms M′, attached to said shaft, and means for actuating the shaft, comprising a crank-arm, M³, thereon, a lever, M⁴, a wheel, H, provided with a pin, $h$, and a spring-detent, M⁵, substantially as described.

16. The combination, with the grain carrying and binding devices, the continuously-rotating shaft H, the wheel H′, mounted to rotate upon said shaft, and provided with a pin, $h^3$, fixed in said wheel, and a clutch device detachably connecting the wheel with the shaft, comprising a radially-movable part or detent, R′, upon the wheel, of a lever, R², pivoted upon the machine-frame and provided with a projecting part, $r'$, constructed to engage the detent R′, and having a part or arm, R³, located in position for engagement with the pin $h^2$ when the said projecting part $r'$ is in position for engagement with the said detent, a spring applied to throw the free end of said lever R² outwardly and the part or arm R³ thereof in position to engage the pin $h^2$, and tripping devices for operating said lever from the driver's seat, substantially as described.

17. The combination, with the driving-shaft H′, provided with a notched collar, R, and the wheel H, loosely mounted upon the shaft and provided with a pin, $h^2$, of a spring-detent, R′, upon the wheel, engaging the collar, a lever, R², pivoted to the machine-frame and provided with a laterally-projecting part, $r'$, adapted to engage the detent R, and having a part or arm, R³, constructed for engagement with the pin $h^2$, a spring applied to hold the said arm in the path of the pin $h^2$, and tripping devices for operating said lever from the driver's seat, substantially as described.

18. The combination, with the driving-shaft H′ and the wheel H, mounted loosely thereon, of a clutch device detachably connecting the wheel and shaft, and comprising a movable part or detent, R′, upon the wheel, a pivoted lever, R², provided with a lateral projection, $r'$, adapted to engage the detent R′, and having a part or arm, R³, constructed for engagement with the pin $h^2$, a spring applied to hold said arm R³ in the path of the pin, and a tripping device for operating the lever, consisting of a rock-shaft, R⁵, provided with an arm, R⁶, resting upon the lever R², and with an arm, $r^4$, and a foot-lever, R⁷, connected with said arm $r^4$, substantially as described.

19. The combination, with the machine-frame provided with a reel-support, S², and a reel having a pulley, $s^4$, of a swinging frame, S′, pivoted upon the support S², and affording bearings for the reel, a driving-pulley, $G^7$, upon the machine-frame, a swinging arm, $T^2$, a shaft, $T'$, mounted upon said arm $T^2$, and provided with belt-pulleys $t$ and $t'$, a belt, $T^3$, trained over the pulleys $t'$ and $s^4$, and an elastic belt, T, passing over the pulleys $G^7$ and $t$, substantially as described.

In testimony that I claim the foregoing as my invention I affix my signature in presence of two witnesses.

GRANT W. SHUMAN.

Witnesses:
    H. E. KERN,
    LEE E. SHUMAN.